United States Patent
Von Alman

[19]

[11] Patent Number: 6,095,469

[45] Date of Patent: Aug. 1, 2000

[54] COAT HOOK ASSEMBLY WITH CLOSEOUT PANEL

[75] Inventor: Roy A. Von Alman, Holland, Mich.

[73] Assignee: Prince Corporation, Holland, Mich.

[21] Appl. No.: 09/152,155

[22] Filed: Sep. 11, 1998

[51] Int. Cl.[7] .................................................. F16B 45/00
[52] U.S. Cl. ........................ 248/304; 224/313; 224/553; 24/294.1; 24/305; 24/308
[58] Field of Search .................... 248/304, 305, 248/308, 339, 291.1, 292.13, 292.14, 294.1; 224/553, 313

[56] References Cited

U.S. PATENT DOCUMENTS

| | | | |
|---|---|---|---|
| 338,677 | 3/1886 | Rubenstein | 248/305 |
| D. 403,998 | 1/1999 | Hutzel et al. | D12/190 |
| 2,390,257 | 12/1945 | Jahn | 248/294.1 |
| 3,385,547 | 5/1968 | West | 248/308 |
| 3,424,418 | 1/1969 | Freedman et al. | 248/304 |
| 4,221,354 | 9/1980 | Kempkers | 248/291.1 |
| 4,444,344 | 4/1984 | Marcus et al. | 224/313 |
| 4,720,028 | 1/1988 | Takemura et al. | 224/553 |
| 5,411,233 | 5/1995 | Grimes, III et al. | |
| 5,507,423 | 4/1996 | Fischer et al. | |
| 5,829,725 | 11/1998 | Russo | 248/304 |

*Primary Examiner*—Ramon O. Ramirez
*Assistant Examiner*—Tan Le
*Attorney, Agent, or Firm*—Harness, Dickey & Pierce, P.L.C.

[57] ABSTRACT

A vehicle coat hook assembly is provided with a closeout panel coupled to the coat hook. When the coat hook is moved from a retracted position within a bezel or housing, to an extended use position, the closeout panel moves into and fills the opening in the bezel or housing to provide a finished appearance to the vehicle interior. The closeout panel is rotatably coupled to the coat hook and rotates relative to the hook as the hook is rotated between the retracted position and the extended use position. A guide is also operatively associated with the housing and the closeout panel to guide rotation of the closeout panel as the hook is rotated.

19 Claims, 2 Drawing Sheets

COAT HOOK ASSEMBLY WITH CLOSEOUT PANEL

BACKGROUND OF THE INVENTION

The present invention relates to a coat hook assembly for a motor vehicle and in particular to a coat hook assembly having a closeout panel which covers the opening in a trim bezel when the coat hook is pulled out to a use position.

It is typical in most motor vehicles to provide one or more coat hooks for the convenience of the vehicle occupants. The coat hooks are often mounted to the vehicle body immediately above the rear door opening. This enables the vehicle driver to open the rear door and hang clothes on the coat hook by merely reaching into the vehicle. The coat hook can be attached to the headliner, the interior trim surrounding the door opening or directly to the vehicle body. In some vehicles the hook is part of a larger assembly containing an interior light and/or a grab handle for use by rear seat occupants.

In some instances, the coat hook is attached to a housing or bezel for movement from a retracted position in which the coat hook is substantially within the housing to an extending use position in which the hook projects from the housing and can be used to support a coat or hangers. When the hook is in its extended use position, an opening is revealed in the housing which was previously occupied by the hook. Within the fasteners and other attaching hardware for the housing may be visible when the coat hook is in the extended use position.

Accordingly, it is an object of the present invention to provide a coat hook assembly with an attractive, finished appearance both when the coat hook is in its retracted position in the housing and when the hook is in the extended use position.

SUMMARY OF THE INVENTION

The present invention accomplishes the above objection by providing a closeout panel which is operatively associated with the hook so that the closeout panel moves into a position closing the opening in the housing when the hook is rotated from its retracted position to its extended use position. The closeout panel is attached to the hook so that it moves upon rotation of the coat hook. In a preferred embodiment, the closeout panel is rotatably mounted to the coat hook and rotates relative to the coat hook upon rotation of the coat hook to its extended use position. This enables the hook and closeout panel to fold relative to one another to a compact position whereby they occupy less space in the housing when the coat hook is retracted. A guide between the housing and the closeout panel properly positions the closeout panel in the housing opening.

Further objects, features and advantages of the invention will become apparent from a consideration of the following description and the appended claims when taken in connection with the accompanying drawings.

Figure 4:
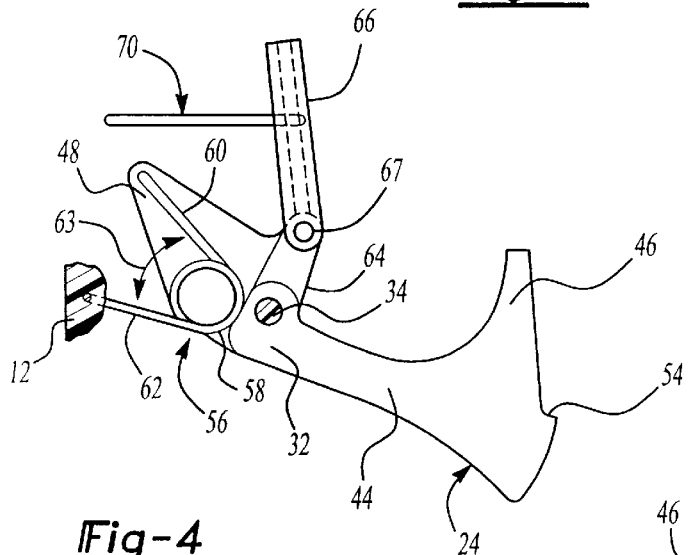

FIG. is a rear view of the housing showing the coat hook assembly mounted thereto;

FIG. 4 is a side view showing the coat hook in its extended use position; and

Figure 5:
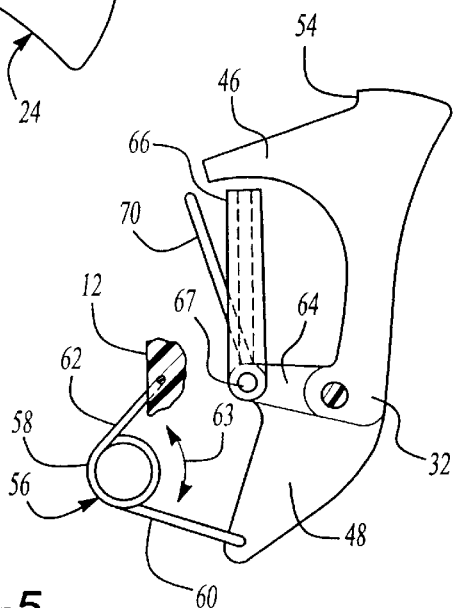

FIG. 5 is a side view showing the coat hook in its retracted position.

DETAILED DESCRIPTION OF THE PREFERRED EMBODIMENT

Figure 1:
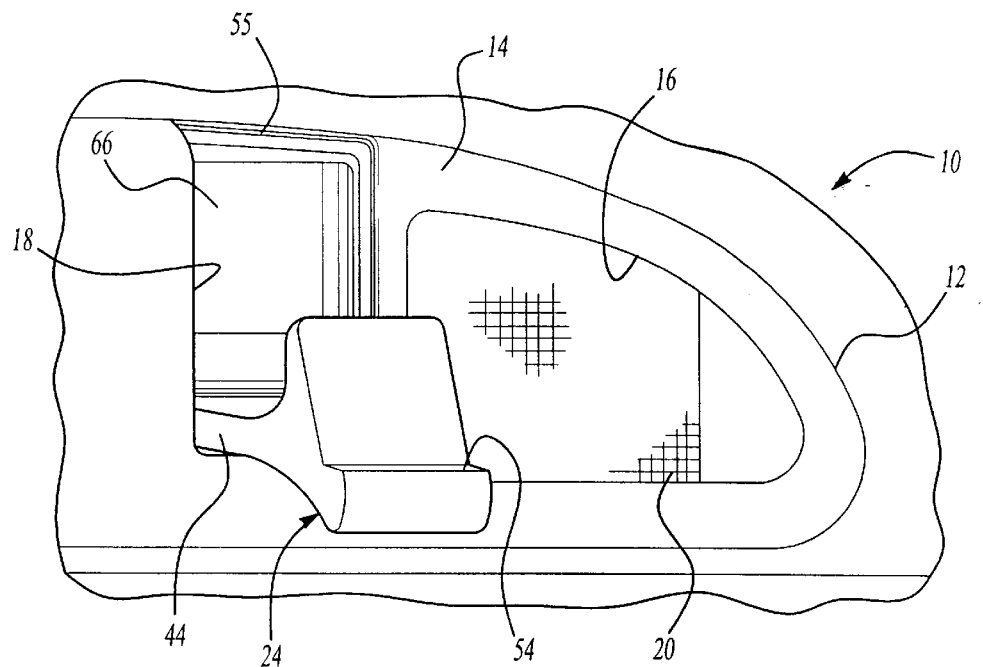
FIG. 1 is a front perspective view of a housing containing the coat hook assembly of the present invention.

The hook assembly of the present invention is shown in FIG. 1 as part of an interior hook and light assembly 10. The assembly 10 includes a housing or bezel 12, typically made of a molded plastic. The housing has a front face 14 which includes a light opening 16 and a hook opening 18. The light opening 16 is covered with a lens 20. An electric lamp (not shown) is disposed behind the lens 20 to provide interior lighting for a motor vehicle. A hook 24 is shown extending from the housing 12 in its extended use position.

Figure 2:
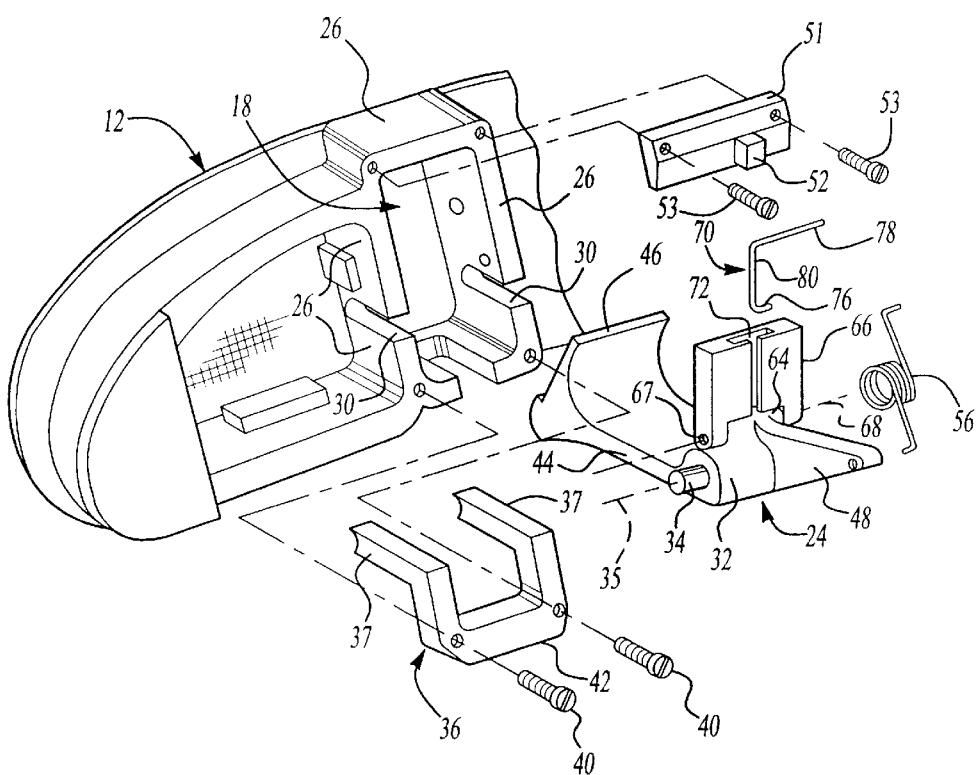
FIG. 2 is an exploded rear perspective view of the housing and coat hook assembly shown in FIG. 1.
Figure 3:
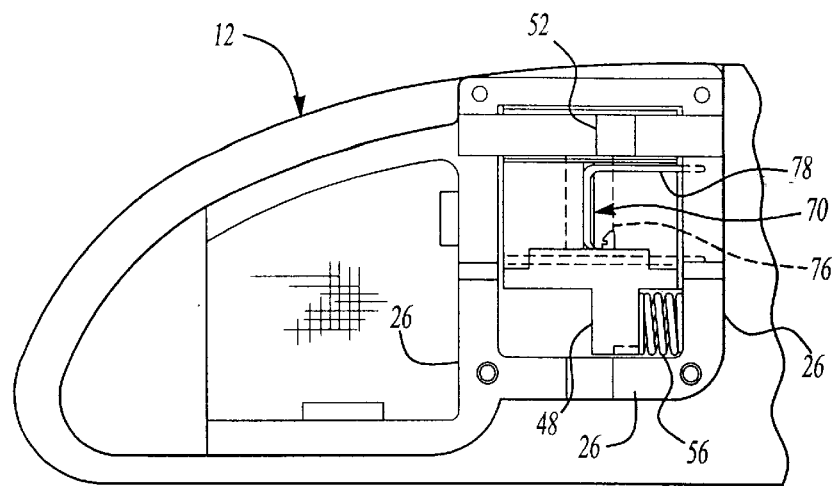

With reference to FIG. 2, additional detail of the housing is shown. The housing 12 has rearward extending walls 26 about the opening 18. The walls 26 are formed with a pair of slots 30 which extend from the rear ends of the walls forward, toward the opening 18. The hook 24 includes a mounting portion 32 from which pivot pins 34 extend. The pivot pins 34 define a pivot axis 35. The pivot pins 34 are disposed within the slots 30 and positioned at the foreword ends of the slots 30, closest to the opening 18. A retainer 36 is used to hold the hook 24 in place. The retainer 36 is generally U-shaped and has a pair of legs 37. The legs 37 are inserted into the slots 30 behind the pivot pins 34 to capture the pivot pins 34 and thus attach the hook 24 to the housing. Screws 40 are inserted through apertures in the end wall 42 of the retainer 36 and into the rear face of the walls 26. The slots could be designed with detents to enable the pins 34 to snap into the slots and be retained without the use of a separate retainer.

The hook 24 includes a hook arm 44 extending radially form the mounting portion 32. The hook arm has an upwardly extending lip 46 at the distal end thereof to retain hangers and coats placed on the hook arm 44. Also extending radially outward from the mounting portion 32 is a stop arm 48. When the hook is rotated to an extended use position, the distal end 50 of the stop arm 48 engages a rubber stop 52. The stop 52 is placed on end plate 51 attached by screws 53 to the wall 26 at the upper end of the opening 18. The end plate extends downward into the opening 18, reducing the opening height at the back of the housing 12 after the coat hook 24 has been installed. The end plate 51 presents the stop 52 at the proper height to engage the stop arm 48. With a different housing geometry, the end plate 51 may be eliminated. The stop 52 limits the rotation of the hook 24 into its extended use position.

The distal end of the hook arm 44 is formed with a ledge 54. The ledge 54 engages the front face 14 of the housing at the upper end 55 of the opening 18 to form a rotation stop for the hook in its stowed position within the housing 12.

An overcenter spring 56 biases the hook 24 to both its retracted position and its extended use position. The overcenter spring 56 is a torsional spring having a coil 58 and a pair of radially extending arms 60 and 62. The spring arm 60 is coupled to the stop arm 48 of the hook 24 near its distal end 50. The other spring arm 62 is attached to the housing 12. The spring force acts to separate the spring arms 60, 62 from one another as shown by the arrows 63 in FIGS. 4 and 5. The hook is shown in the retracted position in FIG. S in which the spring 56 urges the hook in a counter clockwise direction, forcing the ledge 54 against the housing front face 14. This holds the hook in the retracted position. When the hook 24 is rotated to the extended use position as shown in FIG. 4, the coil 58 of the spring 56 moves in space to a position where the spring force separating the spring arms 60, 62 now urges the hook to rotate clockwise, and holds the stop arm 48 in engagement with the rubber stop 52.

The hook 24 also has a closeout panel mounting arm 64 which extends radially from the mounting portion 32 at approximately 90° relative to the hook arm 44. A closeout panel 66 is coupled to the mounting arm 64 by a pivot pin 67 for rotation of the closeout panel relative to the mounting arm 64. The pivot pin 67 defines a pivot axis 68 which is substantially parallel to the hook pivot axis 35 defined by the pivot pins 34.

In the retracted position of the hook 24, the closeout panel 66 is generally parallel to the hook arm 44 and nests within the bight defined by the hook arm 44 and the upwardly extending lip 46 at the distal end of the hook arm 44. When the hook 24 is rotated to the extended use position, the closeout panel 66 rotates relative to the hook 24 about the closeout panel pivot axis 68. A guide, in the form of a confinement wire 70, is operatively coupled to the closeout panel 66 and the housing 12, causing the closeout panel to rotate relative to the hook 24 as the hook 24 is rotated to the extended use position. The movement of the closeout panel 66 places the closeout panel in the hook opening 18 in the housing, thereby closing the opening when the hook 24 is in the extended use position.

The closeout panel 66 has a T-shaped slot 72 which is open to the rear surface 74 of the closeout panel 66. The slot 72 extends from the distal end of the closeout panel 66 toward the pivot axis 68. The confinement wire 70 can be generally described as being U-shaped with unequal length legs 76, 78 and a cross bar 80 connecting the two legs 76, 78. The shorter leg 76 is placed within the T-slot 72 in the closeout panel 66. The longer leg 78 is attached to the wall 26 of the housing 12. The housing 12, the hook 24, the closeout panel 66 and confinement wire 70 form a 4-bar linkage. As shown in FIGS. 4 and 5, the closeout panel, when it moves into an operative position within the hook opening 18, is only slightly rotated relative to the orientation of the closeout panel when the hook is in the retracted position. Guide mechanisms, other than the confinement wire 70, can be used to guide the movement of the closeout panel 66 from the retracted position to the operative position. Raised ribs or grooves in the housing wall can guide the closeout panel 66.

While the closeout panel 66 has been shown rotatably coupled to the hook 24, it will be readily appreciated that a non-rotatable closeout panel, integrally formed with the hook 24 as a single piece molding, can perform the same function of closing the opening 18 in the housing. Such an integral closeout panel and hook would not require any form of guide to position it within the opening 18. Rather, the closeout panel would merely rotate with the hook and be held in position by the bias spring holding the hook in its extended use position. The only requirement for such a single piece hook and closeout panel is the necessary space within the housing, behind the front face 14 to contain the closeout panel which would extend further behind the front face 14 than the panel 66 described above. Depending upon the packaging space within the vehicle body, such a design may be feasible.

The closeout panel 66 operates to close the opening 18 in the housing when the hook is in the extended use position. This prevents viewing of fasteners or other items in the interior of the housing and provides a more finished appearance to the vehicle interior.

It is to be understood that the invention is not limited to the exact construction illustrated and described above, but the various changes and modifications may be made without departing from the spirit and scope of the invention as defined in the following claims.

What is claimed is:

1. A hook assembly for a vehicle comprising:

a housing having a face surface and an opening therein;

a hook rotatably mounted to said housing for rotation between a retracted position and an extended use position, said hook being substantially within said opening and substantially closing said opening when in said retracted position, said hook extending from said housing and said opening when in said extended use position; and a closeout panel operatively associated with said housing and rotatable mounted to said hook for rotation relative to said hook about a pivot axis between a stowed position behind said face surface when said hook is in said retracted position and an operative position within said opening to close said opening when said hook is moved to said extended use position.

2. The hook assembly as defined in claim 1 further comprising a guide coupled to said housing and said closeout panel to guide the motion of said closeout panel as said hook is rotated between said retracted position and said extended use position.

3. The hook assembly as defined in claim 1 wherein said hook rotates relative to said housing about a hook pivot axis and said closeout panel rotates relative to said hook about a closeout panel pivot axis generally parallel to said hook pivot axis.

4. The hook assembly as defined in claim 3 further comprising a guide coupled to said housing and said closeout panel to guide the motion of said closeout panel as said hook is rotated between said retracted position and said extended use position.

5. The hook assembly as defined in claim 4 wherein said closeout panel has a slot therein and said guide includes a wire having one end coupled to said housing and a second end coupled to said closeout panel and movable within said slot in said closeout panel as said closeout panel moves between said stowed position and said operative position.

6. The hook assembly as defined in claim 1 wherein said hook includes a mounting portion, a hook arm extending radially from said mounting portion in a first direction and a closeout panel mounting arm also extending radially from said mounting portion in a second direction; and wherein said closeout panel is coupled to a distal end of said closeout panel mounting arm.

7. The hook assembly as defined in claim 6 wherein the closeout panel is generally parallel to said closeout panel mounting arm when said closeout panel is in said operative position within said opening.

8. The hook assembly as defined in claim 6 wherein said closeout panel rotates approximately 90 degrees relative to said closeout panel mounting arm as said closeout panel moves between stowed and operative positions.

9. The hook assembly as defined in claim 1 further comprising a bias mechanism urging said hook to both said retracted position and said extended use position.

10. The hook assembly as defined in claim 9 wherein said bias mechanism includes an over center spring coupled to said housing and said hook and which urges said hook into both said retracted position and said extended use position.

11. A hook assembly for a vehicle having a vehicle body, said hook assembly comprising:

a housing having an opening therein;

a hook mounted to said housing, said hook able to rotate from a retracted position to an extended use position;

a closeout panel operable to cover said opening when said hook is in said extended use position, said closeout panel having a stowed position behind said opening and an operative position within said opening; and a guide coupled to said housing and said closeout panel to guide the motion of said closeout panel as said hook is rotated between said retracted position and said extended use position, wherein said closeout panel has a slot therein and said guide includes a wire having one end coupled to said housing and a second end coupled to said closeout panel and movable within said slot in said closeout panel as said closeout panel moves between said stowed position and said operative position.

12. The hook assembly as defined in claim 11 wherein said closeout panel is dimensioned to be received in said opening when said hook is in said retracted position.

13. The hook assembly as defined in claim 11 wherein said closeout panel is dimensioned to substantially cover said opening when said hook is in said extended use position.

14. The hook assembly as defined in claim 11 herein said closeout panel is disposed in a first position when said hook is in said retracted position and is displaced to a second position substantially covering said opening when said hook assembly is in said extended use position.

15. The hook assembly as defined in claim 14 herein movement of said hook from said retracted position to said extended use position causes said closeout panel to move from said first position to said second position.

16. A method for forming a hook assembly for a vehicle having a vehicle body, said method comprising the steps of:

forming a housing operable to be mounted to the vehicle, said housing having an external surface and a opening therein;

forming a hook for mounting to said housing, said hook being able to move from a retracted position to an extended use position; and forming a closeout panel operable to cover said opening in said housing when said hook is in said extended use position; and rotatably mounting said closeout panel to said hook for rotation relative to said hook between a stowed position behind said opening and an operative position within said opening, whereby said opening in said housing is able to receive said hook when said hook is in said retracted position and said closeout panel is able to cover said opening when said hook is in said extended use position.

17. The method for forming a hook assembly for a vehicle as defined in claim 16 wherein said step of forming a closeout panel further includes the step of causing mechanically communication between said closeout panel and said hook so that movement of said hook between said retracted position and said extended use position at least in part controls movement of said closeout panel.

18. The method for forming a hook assembly for a vehicle as defined in claim 16 wherein said step of forming a closeout panel includes the step of causing mechanically communication between said closeout panel and said hook so that movement of said hook from said retracted position to said extended use position causes said closeout panel to cover said opening in said housing.

19. The method for forming a hook assembly for a vehicle as defined in claim 17 wherein the movement of said hook which at least in part controls movement of said closeout panel includes rotational movement of said hook with respect to said housing.

* * * * *